March 28, 1933.                G. O. HODGE                1,903,217
                                BALL BEARING
                            Filed Oct. 10, 1929
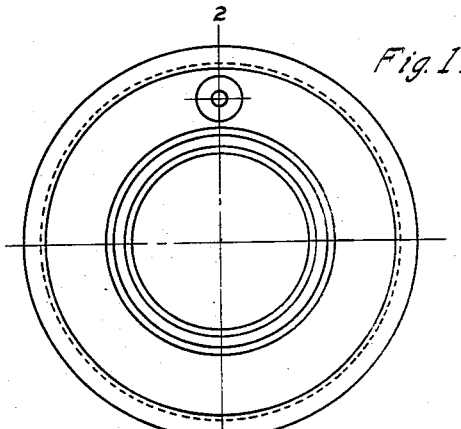
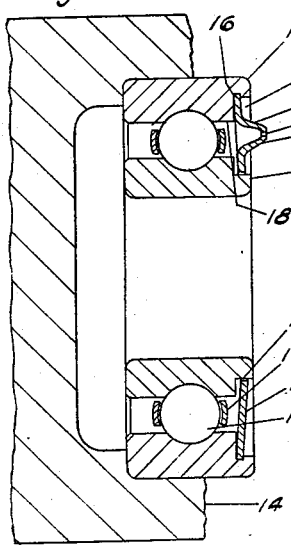
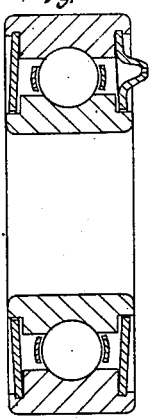
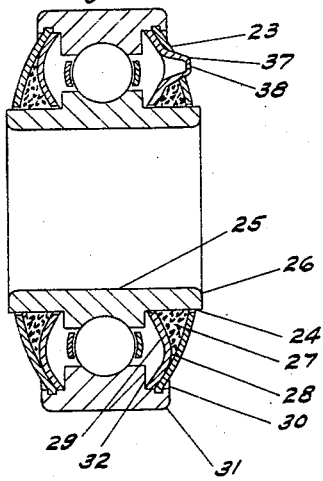
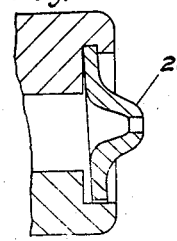
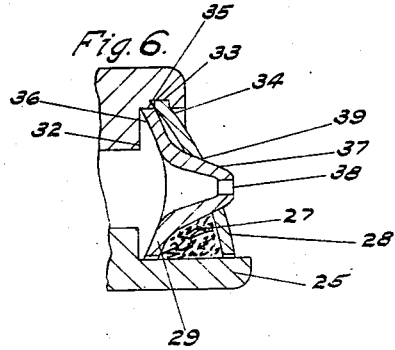
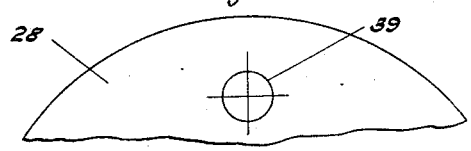
INVENTOR,
George O. Hodge,
BY Louis M. Schmidt
ATTORNEYS.

Patented Mar. 28, 1933

1,903,217

UNITED STATES PATENT OFFICE

GEORGE O. HODGE, OF PLAINVILLE, CONNECTICUT, ASSIGNOR TO STANDARD STEEL AND BEARINGS INCORPORATED, OF PLAINVILLE, CONNECTICUT, A CORPORATION OF DELAWARE

BALL BEARING

Application filed October 10, 1929. Serial No. 398,762.

My invention relates to improvements in ball bearings of the form that is provided at one end or in some cases at both ends with a retainer structure, usually made of sheet metal, that serves to confine lubricant, usually in the form of grease, within the bearing structure, specific forms of which bearings are shown and described respectively in Patent No. 1,719,702, issued July 2, 1929, and application Serial No. 368,871, filed June 6, 1929, which issued on January 5, 1932, as Patent No. 1,839,677, the applications in both instances being filed by myself, and the object of my improvement is to provide in the structure of such sheet metal lubricating means an integral nipple that is perforated at the apex for cooperation with a force pump or grease gun for the purpose of charging the bearing with a supply of lubricating grease or replenishing the charge therein to make up for such part as may be used up under operating conditions.

In the accompanying drawing:—

Figure 1 is a side elevation of a ball bearing embodying my invention, the retainer structure being generally after the manner shown and described in the patent mentioned.

Fig. 2 shows a sectional view of the bearing on the line 2—2 of Fig. 1 and with the end of the bearing remote from that having the charging nipple closed by part of the fixed supporting structure.

Fig. 3 shows a corresponding sectional view in which the said remote end is closed after the manner of the structure of the patent.

Fig. 4 is a corresponding sectional view in which the bearing ends are both provided with retainer structures corresponding to one of the forms of the application mentioned.

Figs. 5 and 6 are fragmentary sectional views respectively of the two forms above referred to of the retainer structures.

Fig. 7 is a fragmentary view of the blank for the outer retainer plate of Figs. 4 and 6.

My improved ball bearing comprises as the bearing structure proper the usual outer ring 10, inner ring 11, ball retainer 12, and balls 13 and which is provided with retaining means for confining a charge of lubricant in the form of grease within the bearing structure. Such retaining means at one of the ends at least comprises an annular plate-like structure of sheet metal. My invention involves in providing the said sheet metal structure, preferably by swaging the material of the plate, with a boss or nipple that is adapted to cooperate with the delivery nozzle of a force pump or grease gun of any of the well known forms for receiving therefrom a supply of grease for the bearing, the said boss or nipple being perforated to admit the grease.

The other end of the bearing may be closed against the escape of the charge of grease in a manner similar to the end that is provided with the charging nipple or in some other manner, such as by the closed part 14 of the fixed supporting structure that is chambered to house the outer bearing ring 10 shown in Fig. 2.

In the structure that is shown in Fig. 2 the retainer structure 15 is generally in the form of an annular plate that is seated by its peripheral portion in a radial slot 16 that opens inwardly into the bore of the outer ring 10, or into an enlargement or recess 17 at the end of said bore 18. That is to say, the slot 16 extends outwardly in the material of the outer ring 10 from a cylindrical face that encloses part of the opening of the outer ring 10. The retainer structure 15 is forced into place after the manner described in the patent mentioned.

Other means of operatively housing the periphery of the retainer structure by its periphery at the end of the bore of the outer ring may be employed.

The radial inner edge portion of the retainer structure 15 is operatively housed in a rabbet 19 that is provided in the inner ring 11 on the outside at one end, the parts being closely associated so as to prevent the escape of the lubricating grease.

The charging nipple 20 is formed in the retainer structure 15 by forcing outwardly part of the sheet material so as to form an approximately conical structure that is provided at the apex with the inlet perforation 21 and that is bordered by an approximately conical seat 22 that is adapted to cooperate with a conical walled socket or the like at the delivery end of a force pump or grease gun or the like.

I find that an inlet or supply perforation 21 having a diameter of approximately fifty one-thousandths of an inch gives satisfactory results for the two functions respectively of operating to receive quite freely the charge of grease from the charging gun and of retaining the charge of grease within the bearing, without positively closing the perforation by mechanical means, with grease having the consistency that is common for use in ball bearings.

In the structures shown the outer ring supports the charging nipple and said outer ring is the part of the bearing that is held fixed. The nipple is provided on a part of the bearing that is exposed and accessible and may or may not be at the top side of the bearing.

In the form that is shown in Figs. 4 and 6, in which the lubricant retainer structure 23 conforms to one of the forms of the application mentioned said retainer structure comprises a pair of sheet metal plates of annular form and a wiper of felt, the latter contacting with a cylindrical face on the inner ring.

The cylindrical contact face 24 mentioned is provided on a part of the inner ring 25 that includes an extension 26 for providing the necessary length. The felt wiper 27 that makes contact with the contact face 24 is housed between annular plates of sheet metal, respectively the outer plate 28 and the inner plate 29. The peripheries of the plates 28 and 29 are housed generally in a rabbet 30 at the end of the opening in the outer ring 31 that terminates at a radial shoulder 32.

Spaced outwardly from the shoulder 32 is a radial slot 33 into which is forced the peripheral portion 34 of the outer plate 28. The short cylindrical part 35 of the border wall of the rabbet 30 between the shoulder 32 and the radial slot 33 serves as the seat for the peripheral edge 36 of the inner plate 29 generally, but actually is made slightly shorter than the thickness of said inner plate 29 so that the inner plate is squeezed between the outer plate 28 and the shoulder 32.

As the plates 28 and 29 approach the inner ring 25 they diverge generally so as to provide therebetween a space in which the wiper 27 is housed, all as described in the application mentioned.

As shown, the charging nipple 37, provided with the feed or inlet opening 38, is provided on the inner plate 29 and differs from the nipple 20 in being slightly longer so as to project through and beyond the opposed structure of the outer plate 28.

Said outer plate 28 is provided with an opening 39 in registration with the nipple 38, through which the latter projects.

The border wall of the opening 39 and the opposed face of the nipple 37 are brought into close association during the forceful assembling operation that is employed in securing the lubricant retainer structure 23 in place.

The nipple 37 and registering opening 39 are located in parts of the plates 29 and 28 that are located radially outside the wiper 27 in parts of said plates that are closely adjacent one to the other so that the function of the wiper is not disturbed thereby.

I claim as my invention:—

1. In a ball bearing, inner and outer rings with balls therebetween, a lubricant retainer of sheet metal of annular form supported by its periphery from said outer ring and projected inwardly towards the axis so as to overhang the inner ring, the overhanging portion of said retainer being constructed and arranged to prevent escape of lubricant from the bearing under operating conditions, said retainer being provided with a perforation of such small diameter to permit of being plugged by lubricating material under such operating conditions and being sufficiently large to permit of passage of lubricant for charging the bearing under pressure conditions and the border walls of said perforation being pressed outwardly in conical form so as to facilitate cooperation with a lubricant charging device and to reinforce said border walls.

2. In a ball bearing comprising inner and outer rings with balls therebetween and a lubricator retainer structure operatively closing one end of the bearing, said structure comprising an annular plate of sheet metal that is supported by one of said rings and is closely associated with the other thereof, said plate being provided with an opening that is free and unobstructed and of a size such as to be plugged by grease under normal conditions and thus permit the plate to operate to retain grease within the bearing and to admit grease therethrough for charging the bearing under forceful pressure conditions, such as provided by means of a grease-gun or the like, and said retainer structure comprising a second annular plate, outside said first mentioned plate that is likewise supported by one of said rings, a wiper of felt being clamped between said plates, and said second plate being provided with a relatively large opening for providing access to said opening in said first mentioned plate.

GEORGE O. HODGE.